United States Patent

Escoffier et al.

[15] 3,639,740
[45] Feb. 1, 1972

[54] RING COUNTER APPARATUS

[72] Inventors: Raymond P. Escoffier, Wylie; Milton R. Watson, Richardson, both of Tex.

[73] Assignee: Collins Radio Company, Dallas, Tex.

[22] Filed: July 15, 1970

[21] Appl. No.: 54,959

[52] U.S. Cl. ................................235/153, 307/223, 328/43
[51] Int. Cl. ........................................G11c 29/00, G06f 11/00
[58] Field of Search ...............340/146.1; 235/153; 307/223; 328/43

[56] References Cited

UNITED STATES PATENTS

| | | | |
|---|---|---|---|
| 3,184,612 | 5/1965 | Petersen | 307/223 X |
| 3,163,847 | 12/1964 | O'Connor, Jr. | 340/146.1 |
| 3,217,185 | 11/1965 | Jansons | 307/223 X |
| 3,280,343 | 10/1966 | Kuhl | 307/223 X |
| 3,329,834 | 7/1967 | Klinikowski | 307/223 X |
| 3,513,329 | 5/1970 | Washizuka et al. | 307/223 |

OTHER PUBLICATIONS

Maasberg, Self-Correcting, Synchronizable Ring Counter, IBM Technical Disclosure Bulletin, Vol. 10, No. 3, August 1967, pp. 232–234.

*Primary Examiner*—Charles E. Atkinson
*Attorney*—Robert J. Crawford and Bruce C. Lutz

[57] ABSTRACT

A plurality of low-speed flip-flops connected to provide high-speed ring-counter-type operation through the use of parallel operating ring counter and shift register stages. The circuit also comprises means for assuring one and only one logic 1 in the device.

6 Claims, 1 Drawing Figure

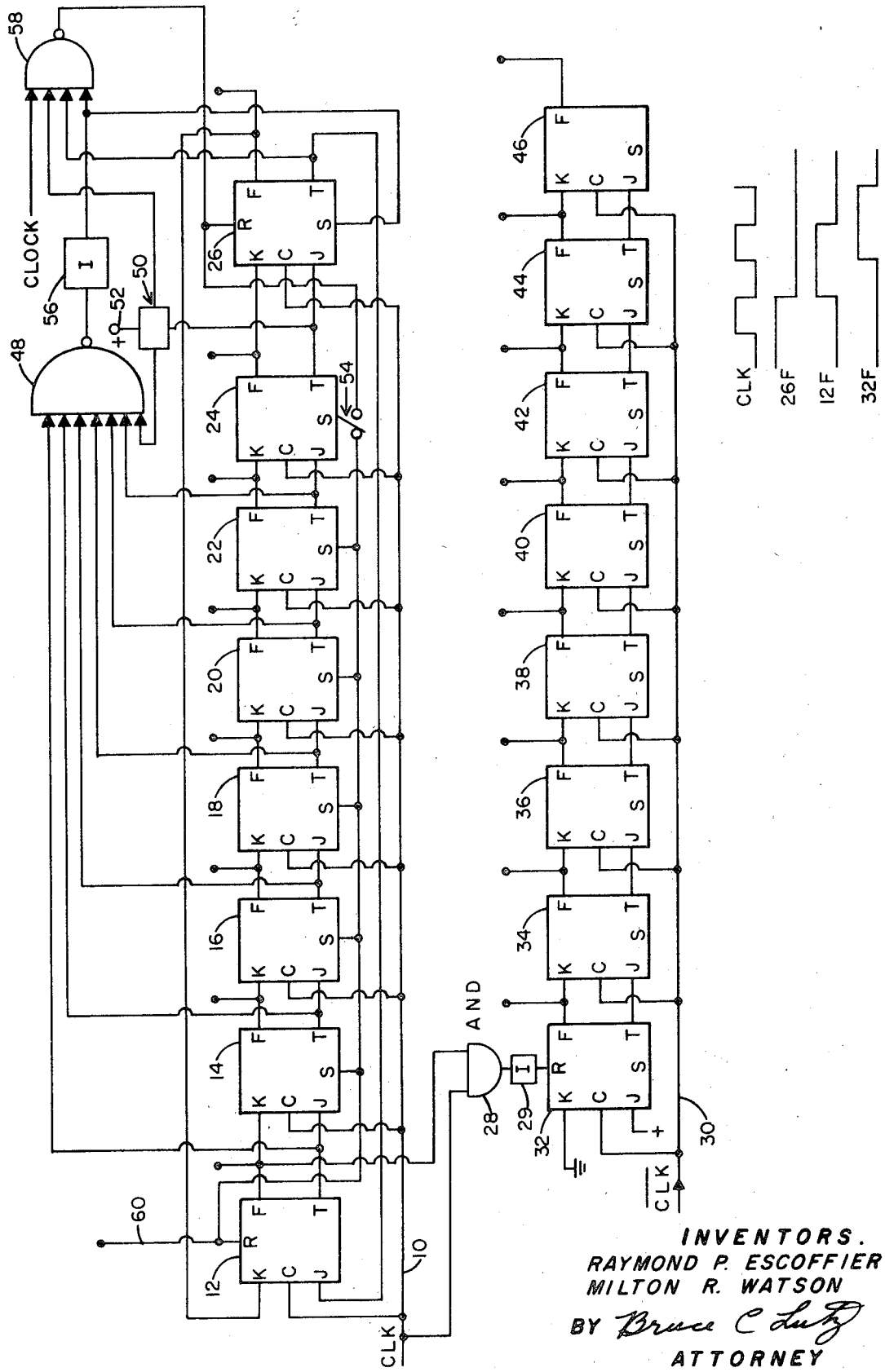

RING COUNTER APPARATUS

The present invention is concerned primarily with electronic circuits and more specifically with a circuit which performs the functions of a high-speed ring counter while utilizing lower speed flip-flop devices.

The prior art has many types of ring counters but they have been subject to two failings. One is the possibility of more than one logic 1 circulating in the ring counter so that the devices being actuated from the ring counter are actuated more than once per cycle. A further possibility is that the ring counter might be turned on with no logic 1's in the loop. This of course would fail to actuate any device connected to the ring counter. A further problem with prior art ring counter circuits is that as the clock speeds increase, the repetition period in the clocking signal eventually becomes as small as the delay inherent in the flip-flops being used in the ring counter. This, of course, creates problems in the consecutive clocking of the flip-flops.

The above problems have been solved by the present invention wherein a special auxiliary circuit is utilized in conjunction with the flip-flops to eliminate all but one logic 1 in the ring counter circuit and to assure that there will be one logic 1 in the circuit. In addition, the circuit is designed such that one or more shift registers may be connected to operate in parallel with the ring counter such that the pulsing- or counting-type operation will still be obtained at high speeds while the clocking of any individual set of flip-flops occurs at a lower speed.

It is therefore an object of the present invention to provide improved ring-counter-type circuitry.

Other objects and advantages of the present invention may be ascertained from a reading of the specification and claims in conjunction with the appended drawing which shows a schematic block diagram including waveforms of a preferred embodiment of the invention.

A clock input signal is applied to lead 10 in the drawing which is connected to C-inputs of each of a plurality of flip-flops labeled 12–26 in the drawing. The clock input is also applied to a first terminal of an AND-gate 28 which receives a second input from flip-flop 12. A clock false signal which is designated in the drawing as $\overline{CLK}$ is connected to a line 30 which is further connected to the C-inputs of a plurality of flip-flops numbered 32–46. AND-gate 28 has an output connected through an inverter 29 to an R-input of flip-flop 32. Each of the above referenced flip-flops has an unconnected output terminal at the upper right-hand portion thereof. In the flip-flops this terminal is labeled F. As is well known to those skilled in the art, a JK flip-flop such as shown operates in the same fashion whether the set and reset pluses are applied to the R- and S-inputs or vice versa. In other words, a negative-going pulse supplied to either one of these terminals will provide a positive-going output at the adjacent F- or T-terminals, respectively. Therefore, the upper terminal will be defined as true and the lower as false regardless of letter designations placed there by the manufacturer of the flip-flops. The ring counter portion of this circuit comprises flip-flops 12–26 wherein the output of each stage is connected to the input of each of the following stages. As shown, the upper and lower output terminals of each stage are connected to the upper and lower input terminals of the following stage. The shift register portion comprises a first stage 32 having the K-input connected to ground and the J-input connected to a logic 1 voltage level which is shown as a positive potential. Each of the following stages has its input connected to the output of the previous stage. The final stage 46 merely has an output connected to the upper terminal. A NAND-gate 48 has direct inputs from the T or lower output terminal of each of the first six stages 12–22. It also receives an input from a reversing switch 50. Reversing switch 50 has an input connected to a positive terminal 52 and an input connected to the T-output terminal of flip-flop 24. The operation of switch 50 is in conjunction with a further switch 54 operatively connecting S of flip-flop 24 between the S-inputs of flip-flops 14–22 and an R-input of flip-flop 26. An output of NAND-gate 48 is connected through an inverter 56 to a first input of a further NAND-gate 58 to provide a false output thereto indicative of the signal from NAND-gate 48. NAND-gate 58 is connected to receive a plurality of further inputs one of which is a clock (the same as or similar to that on lead 10) and the other two of which are from the reversing switch 50 and the T-output of the flip-flop 26. An output of NAND-gate 58 is connected to the R-input of flip-flop 26 and also to one of the contacts of switch 54.

With the switch 54 in the condition shown, the reversing switch 50 operates to connect the T-terminal of flip-flop 24 to the lower input of NANd-gate 48 and the positive terminal 52 to the second from the top input of NAND-gate 58. When switch 54 is in the other position, reversing switch 50 connects positive terminal 52 to the input of NAND-gate 48 and the T or lower output of flip-flop 24 to the input of NAND-gate 58. For initial discussion purposes the circuitry comprising NAND-gates 48 and 58 may be disregarded and it may be assumed that the ring counter has only one logic 1 circulating therein. As each clock pulse is received on line 10, a clock is received at the C-input of each of the flip-flops 12–26. However, the JK flip-flops operate in response to a clock pulse only in conjunction with an input on each of the J- and K-inputs. These inputs must be of the opposite polarity. Thus, only the flip-flop which is receiving an output from the previous stage will react to the clock input. A given delay time after application of the clock input, the succeeding stage will be in condition for reacting to the next clock pulse. Normal operation of flip-flops comprises utilizing only either the leading or trailing edge of the clock pulse in conjunction with a given polarity signal at K and its inverse signal at J.

The waveforms shown in conjunction with the drawing illustrate that flip-flop 26 has an output as shown which provides a logic 1 input to the K-terminal of flip-flop 12. On the next negative-going pulse of the clock, the logic 1 signal applied to the K-input and the logic 0 signal applied to the J-input will cause flip-flop 12 to switch or be activated so that its output at the F-terminal is as shown. Thus, a logic 1 input will be supplied to AND-gate 28. When the clock becomes positive there will be two logic 1 inputs to AND-gate 28 and a logic 0 output will occur to activate flip-flop 32 through the inverted output of inverter 29. Since the $\overline{CLK}$ applied to terminal 30 is the inverse of the clock signal applied to lead 10, the flip-flop 14 will be activated a half-clock-cycle later than flip-flop 32 and subsequently flip-flop 34 will be activated another half-clock-cycle later. When the flip-flop 46 is activated, its output does not activate any further flip-flops but rather the shift register waits until flip-flop 12 is again activated by the output of flip-flop 26.

A practical application of the circuit shown may have its outputs connected to the stages of a storage register such that each successive stage of the storage register is activated to receive a bit of data information. The first stage of the storage register would be connected to flip-flop 12 while the second stage would be connected to flip-flop 32. In this manner a sequential operation of the connected load is obtained at a higher rate than could be obtained by a ring counter having 16 stages instead of the eight as shown for each of the ring counter and the shift register.

Even higher speed operation is possible by adjusting the clocking pulse to further shift registers such that each shift register group operates at a prescribed intermediate time to the operation of similar stages in the ring counter. Of course, the preferred embodiment is as shown but other embodiments may conceivably utilize different numbers of stages in the shift registers than would be utilized in the ring counter.

The process of clearing the ring counter so that it has one and only one logic 1 output as previously mentioned will now be described. For the purpose of explaining the operation, a logic 0 output from the upper terminal will be described as a "normal" output while a logic 1 from the upper terminal will be an "odd" output. The embodiment to be first described will be that utilizing the switches 50 and 54 in the condition shown. As is known, a NAND gate will provide a logic 0 output only if all of the inputs are logic 1. Thus, since the inputs to NAND-gate 48 are connected to the lower terminals of each of the first seven flip-flops of the ring counter, a logic 0 output will be obtained from NAND-gate 48 only when each of the first seven flip-flops are in a normal condition. A logic 0 output from NAND-gate 48 results in a logic 1 being applied to NAND-gate 58 and to the S-input of flip-flop 26 because of inverter 56. A logic 1 input to the S-terminal of flip-flop 26 has no effect. If NAND-gate 58 also receives a logic 1 input from terminal 52 through switch 50 and a logic 1 input from flip-flop 26 indicating that all the stages have a normal output, the next positive clock signal will provide a logic 0 output from NAND-gate 58 thereby resetting the flip-flop 26 to an "odd" condition. If on the other hand, the flip-flop 26 had an output already, there would be a logic 0 output at terminal T and thus the output of NAND-gate 58 would not go to logic 0. Thus, the two conditions of all logic 0 outputs from the ring counter or a logic 1 only on the final stage have been taken care of.

A further possibility is more than one logic 1. The explanation utilized for clearing the extra logic 1's is also applicable to an all logic 1's situation. If there is one or more "odd" outputs from the first seven stages of the flip-flop, the NAND-gate 48 must of necessity have a logic 1 output which will be inverted by inverter 56 to provide a logic 0 to NAND-gate 58 and to the S-input of flip-flop 26. This will cause flip-flop 26 to have a "normal" output since it will be setting the T-terminal to a logic 1. The next clock will set flip-flop 12 to a normal output since no input is received from flip-flop 26. Thus, every time that there is a clock pulse and NAND-gate 48 receives signals indicating that one or more of the first seven stages has an "odd" output, the final stage 26 is set to a "normal" condition. The logic 0's thus progress down the line of flip-flops until each of the first seven stages are set to a normal condition and this leaves stage 26 with an odd output so that the ring counter is in the proper condition. In no instance will it take more than eight clock pulses to assure that the ring counter is in the proper condition. The shift register would also be clearing itself during this same eight clock-pulse time period since the first stage 12 is prevented from having a logic 0 output after the first clock pulse due to the setting to a normal condition of final stage 26.

Design conditions for the present invention indicated that in some instances (not pertinent to the disclosure) it may be desirable to reset the last two stages. In such a situation the NAND-gate 48 would normally be designed with only six inputs. However, to provide a universal illustration, the switch 50 is used to provide a logic 1 input to NAND-gate 48 from terminal 52 and provide the F-output of flip-flop 24 to logic 1 input of NAND-gate 58. As previously indicated the switch 54 is moved to the opposite condition simultaneously with the operation of reversing switch 50. In this situation, the occurrence of one or more "odd" outputs from the first six stages will set flip-flop 26 to a "normal" condition. When each of the first six stages is in a normal condition, a logic 1 will appear at the lower input of NAND-gate 58. If only one of stages 24 and 26 is in an "odd" condition, NAND-gate 58 will not be activated. However, if both flip-flops 24 and 26 are in a "normal" condition, NAND-gate 58 is activated upon the next clock pulse and flip-flop 26 is set to an "odd" condition and flip-flop 24 is set to a "normal" condition. The only other possibility is that both flip-flops 24 will be in an "odd" condition. In such an instance no action will occur. However, the next clock pulse will place flip-flops 12 and 26 in an "odd" condition thereby providing an output from NAND-gate 48 of a type to reset flip-flop 26 to a normal condition thus leaving the only flip-flop in an "odd" condition as flip-flop 12.

A reset input is designated as 60 and is connected to set stage 12 in a logic 1 or "odd" condition and stages 14–24 in a "normal" condition. While this reset could also be applied to all the S-terminals of flip-flops 32–46, taking into account the timing of the clock pulses applied to lead 30, such a connection was not necessary in the present application of this circuit. If such resetting of all of the flip-flops is necessary, it must be realized that a delay of approximately one-half of a full cycle of a clocking pulse (which would be identical to the time period between the occurrence of an output signal on the F-terminals of flip-flops 12 and 32) would be necessary between the application of the reset signal to lead 60 and the subsequent application of a reset signal for the shift register flip-flops 32–46. This input enables the resetting of the counter to a prescribed condition at any given time. Diode logic could be used to also set stage 26 to a "normal" condition with this reset input. For the application of the ring counter by the applicant, the fact that stage 26 might not be in a "normal" condition upon reception of a reset pulse did not render any inconvenience since immediately after flip-flop 12 is placed in an "odd" condition, an output is obtained from NAND-gate 48 to set stage 26 in a "normal" condition. Thus, the entire ring counter has only one "odd" output a very short period of time after the occurrence of a reset pulse on line 60.

While only two embodiments of the present invention have been shown and described through the utilization of reversing switch 50 in conjunction with switch 54, it is to be realized that other embodiments such as mentioned in conjunction with the use of more than one parallel shift register is within the scope of the invention. Thus, we wish to be limited not by the description but only by the scope of the appended claims.

We claim:

1. Apparatus for providing a sequentially occurring and continuously operating pulse train comprising, in combination:
    ring counter means comprising N-stages;
    shift register means comprising N-stages;
    means for supplying clock signals to said ring counter means and to said shift register means whereby said shift register means is clocked intermediate the clocking of two adjacent stages of said ring counter means; and
    gating means connected to receive inputs from said clock means and from the output of one of the stages of said ring counter means and connected to a first stage of said shift register means for activating the first stage of said shift register means intermediate the operation of the first and second stages of said ring counter means.

2. Apparatus as claimed in claim 1 wherein:
    said means for providing clock signals provides opposite phase signals to said ring counter means and said shift register means; and
    said first stage of said shift register means is activated halfway between the operation of said first and second stages of said ring counter means.

3. The method of assuring the occurrence of one and only one "odd" output from a ring counter capable of having either a "normal" or "odd" output from each stage of N-stages thereof comprising the steps of:
    periodically sampling the outputs of a first portion of the stages and setting the final stage of the ring counter to a "normal" output each sampling period until all of said first portion of stage outputs provide "normal" outputs; and
    sampling the remaining portion of said N-stages of the ring counter when said first portion of stages are all in a "normal" output condition to set one of the remaining portion of stages in an "odd" condition and any remaining stages in a "normal" condition if at the sample time each of the output stages are in a "normal" condition.

4. Apparatus for assuring the occurrence of one and only one "odd" output from an N-stage ring counter means each stage of which may provide either a "normal" or "odd" output and wherein the N-stages are divided into M- and R-stage portions comprising, in combination:
    first detection means connected to the M-portion stages of said ring counter means for providing an output for periodically resetting a given one of the R-portion stages of said ring counter means to a "normal" output condition if one or more of said M-portion stages are in an "odd" condition; and second detection means connected to said R-portion stages and to said first detection means for resetting one of said R-portion stages to an odd condition and any remaining R-portion stages to a normal condition when all of said N-stages are in a normal condition.

5. Apparatus as claimed in claim 4 wherein said R-portion comprises one flip-flop stage.

6. Apparatus as claimed in claim 4 wherein:

each of said stages have true and false outputs; and
said first detection means comprises NAND-gating means connected to the false outputs of said N-portion stages and said second detection means comprises NOR-gating means connected to receive the false outputs of said R-portion stages of said ring counter means and a false output of said first NAND-gating means.

* * * * *